US012696257B2

(12) United States Patent
Ye et al.

(10) Patent No.: US 12,696,257 B2
(45) Date of Patent: Jul. 28, 2026

(54) NETWORK BANDWIDTH ADJUSTMENT AND INDICATION

(71) Applicant: Apple Inc., Cupertino, CA (US)

(72) Inventors: Sigen Ye, Whitehouse Station, NJ (US); Ankit Bhamri, Bad Nauheim (DE); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Peng Cheng, Beijing (CN); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 288 days.

(21) Appl. No.: 18/446,379

(22) Filed: Aug. 8, 2023

(65) Prior Publication Data

US 2024/0057056 A1    Feb. 15, 2024

Related U.S. Application Data

(60) Provisional application No. 63/396,540, filed on Aug. 9, 2022.

(51) Int. Cl.
*H04W 72/0457*    (2023.01)
*H04W 28/20*    (2009.01)
*H04W 72/232*    (2023.01)
(52) U.S. Cl.
CPC ....... *H04W 72/0457* (2023.01); *H04W 28/20* (2013.01); *H04W 72/232* (2023.01)

(58) Field of Classification Search
CPC .................................................. H04W 72/0457
See application file for complete search history.

(56) References Cited

U.S. PATENT DOCUMENTS

| | | | | |
|---|---|---|---|---|
| 2022/0014345 A1* | 1/2022 | Abdelghaffar | ........ | H04L 5/0053 |
| 2022/0046522 A1* | 2/2022 | Kim | ...................... | H04W 48/16 |
| 2022/0151012 A1 | 5/2022 | Abdoli et al. | | |
| 2023/0199739 A1* | 6/2023 | Zhou | ................. | H04W 72/0453 |
| | | | | 370/329 |
| 2023/0247614 A1* | 8/2023 | Li | ......................... | H04L 5/0012 |
| | | | | 370/329 |
| 2023/0299914 A1* | 9/2023 | Lim | ...................... | H04L 5/0051 |
| | | | | 370/329 |
| 2023/0397206 A1* | 12/2023 | Deogun | ................ | H04L 5/0098 |

FOREIGN PATENT DOCUMENTS

WO        2022082107 A1    4/2022

OTHER PUBLICATIONS

3rd Generation Partnership Project; Technical Specification Group Radio Access Network; NR; Physical layer procedures for data (Release 17), 3GPP TS 38.214 V17.2.0, Jun. 2022, 228 pages.

(Continued)

*Primary Examiner* — Jason E Mattis
(74) *Attorney, Agent, or Firm* — Kilpatrick Townsend & Stockton LLP

(57) ABSTRACT

The present application relates to devices and components including apparatus, systems, and methods for switching network bandwidth adjustment and indication.

20 Claims, 9 Drawing Sheets

(56)                    References Cited

OTHER PUBLICATIONS

Summary #1 for email discussion on energy saving techniques of
NW energy saving SI, Intel Corporation, 3GPP TSG RAN WG1
Meeting #109-e, R1-2205141, May 9-20, 2022, 132 pages.
New SI: Study on network energy savings for NR, Huawei, 3GPP
TSG RAN Meeting #94e, RP-213554, Dec. 6-17, 2021, 18 pages.
International Patent Application No. PCT/US2023/028962, Inter-
national Search Report and Written Opinion, Nov. 15, 2023, 11
pages.

* cited by examiner

200

400

700

Communicating with one or more UEs via serving cell with first network bandwidth
704

Transmitting network bandwidth indication that indicates second network bandwidth
708

Communicating with the one or more UEs via serving cell with second network bandwidth
712

NETWORK BANDWIDTH ADJUSTMENT AND INDICATION

CROSS REFERENCE TO RELATED APPLICATION

This application claims priority to U.S. Provisional Patent Application No. 63/396,540, filed Aug. 9, 2022, which is hereby incorporated by reference in its entirety.

FIELD

The present application relates to the field of network communications and, in particular, to technologies for network bandwidth adjustment and indication.

BACKGROUND

Third Generation Partnership Project (3GPP) Technical Specifications (TSs) define standards for wireless networks. These TSs describe aspects related to improving network energy savings in terms of base station transmission and reception.

DETAILED DESCRIPTION

Figure 1:
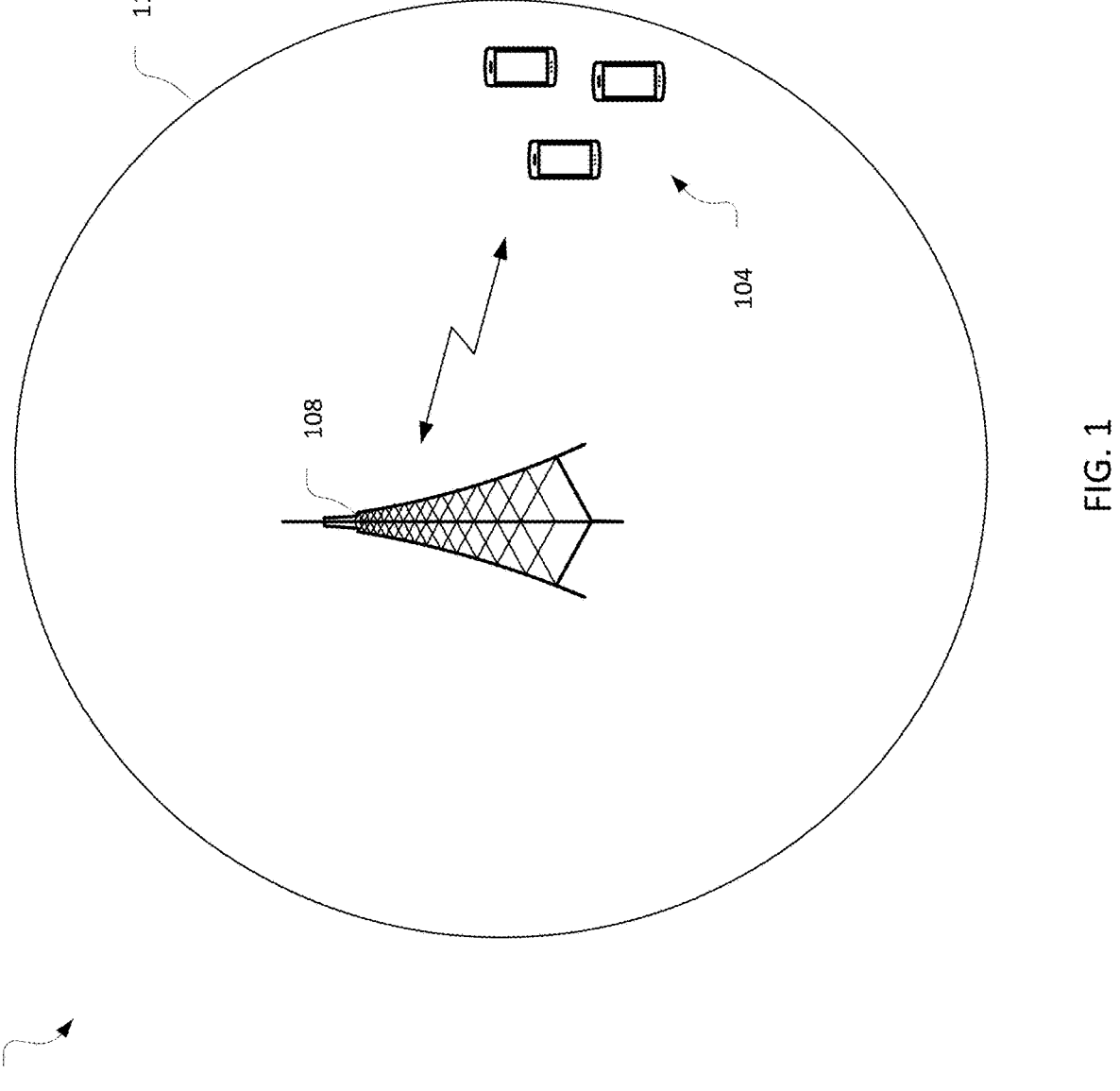
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B); and the phrase "based on A" means "based at least in part on A," for example, it could be "based solely on A" or it could be "based in part on A."

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a number of user equipments (UEs) 104 communicatively coupled with a base station 108 of a radio access network (RAN). The UEs 104 and the base station 108 may communicate over air interfaces compatible with 3GPP TSs such as those that define a Fifth Generation (5G) new radio (NR) system or a later system. The base station 108 may provide user plane and control plane protocol terminations toward the UEs 104 through a serving cell 112.

Operation of the nodes of the network environment 100 may be enhanced by implementing network energy saving principles. For example, the base station 108 and UEs 104 may employ techniques to improve network energy savings in terms of both uplink and downlink transmissions. These network-energy saving techniques may be dynamic or semi-static operations that adapt UL/DL transmissions in time-, frequency-, spatial-, or power-domains. Some embodiments may incorporate support/feedback from the UEs 104, UE assistance information, or other information exchange/coordination over network interfaces of the serving cell 112.

Adaptations to the frequency domain used in communications within the network environment 100 may result in network energy saving. This can be achieved by performing bandwidth part (BWP) switching for each of the UE 104. However, this requires UE-specific signaling (either downlink control information (DCI) or radio resource control (RRC) reconfiguration) for each of the UEs 104 to switch their respective BWPs. This may involve a significant amount of overhead and a large delay. Embodiments of the present disclosure describe dynamic bandwidth adjust for the serving cell 112 in order to obtain similar network energy savings without the overhead related to individual BWP switching. Some embodiments describe the use of cell-specific or UE-group common signaling to enable these dynamic bandwidth adjustments.

The dynamic bandwidth adjustment described herein may include aspects related to signaling a network bandwidth indication and UE behaviors upon receiving the network bandwidth indication. The UE behavior may depend on whether a network bandwidth signaled by the network bandwidth indication contains an active BWP of a UE, or is aligned with one of the UE's configured BWPs. Further aspects also define validity durations for the indicated network bandwidth.

Figure 2:
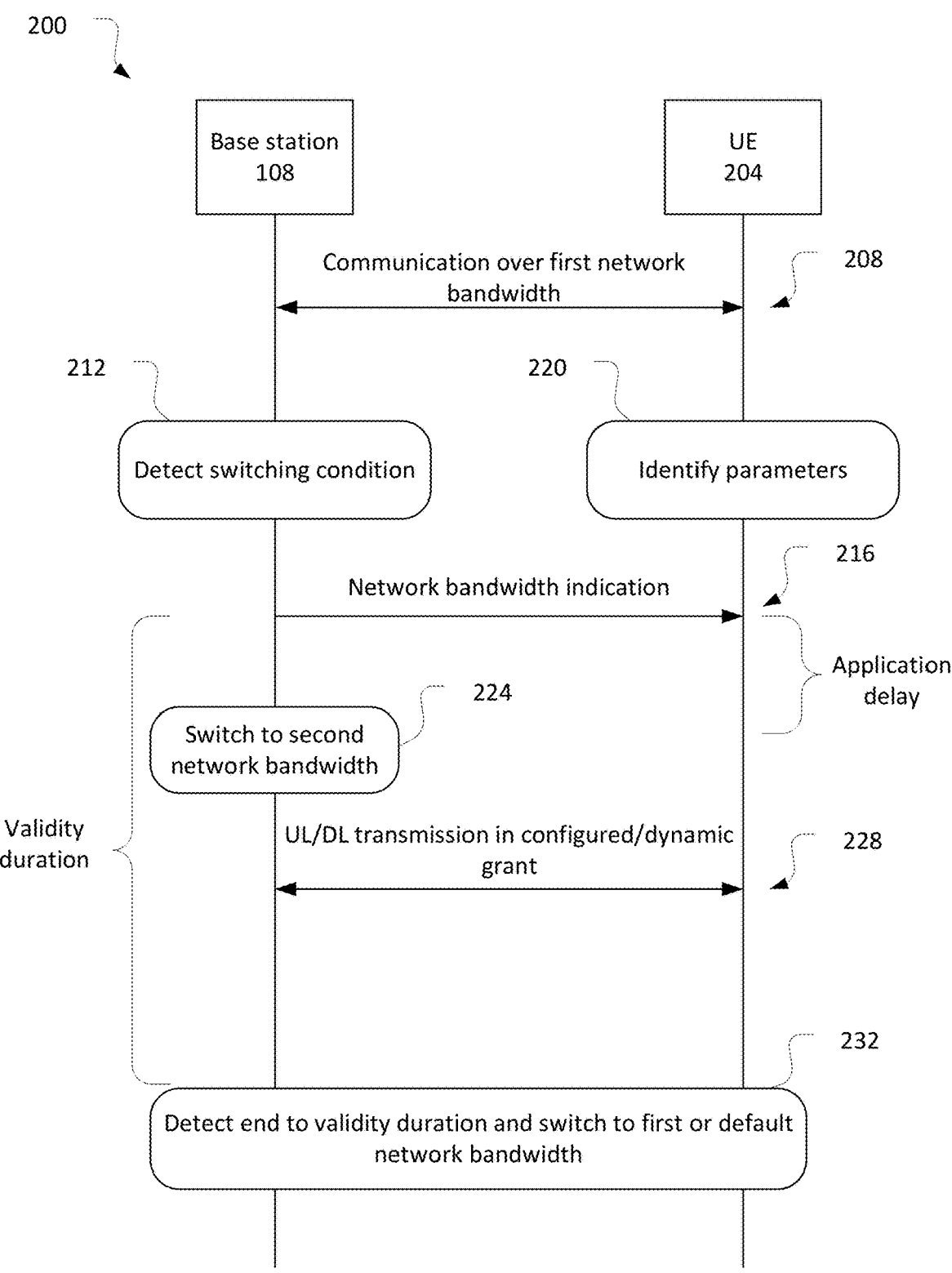
FIG. 2 illustrates a signaling diagram in accordance with some embodiments.

FIG. 2 illustrates a signaling diagram 200 for network bandwidth adjustment and indication in accordance with some embodiments. The signaling diagram 200 may include operations and signals with respect to base station 108 and UE 204. The UE 204 may be similar to, and substantially interchangeable with, any one of the UEs 104 of FIG. 1.

At 208, the base station 108 and the UE 204 may be communicating over a first network bandwidth. The first network bandwidth may be a relatively large (or small) network bandwidth that encompasses a significant portion of a carrier.

At 212, the base station 108 may detect a switching condition. The switching condition may be detected based on an event that prompts the base station 108 to transition into (or out of) an energy-saving mode. Upon detecting the switching condition, the base station 108 may transmit a network bandwidth indication at 216.

The network bandwidth indication may indicate a change to the uplink (UL) or downlink (DL) bandwidth for one or more UEs. In some embodiments, the UL/DL bandwidths may be the same, in which case one network bandwidth indication may be used to indicate a change for both bandwidths. In other embodiments, the UL/DL bandwidths may be different, in which case separate network bandwidth indications may be used to indicate the changes for the UL and DL bandwidths.

In some embodiments, the network bandwidth indication may provide a direct indication of a second network bandwidth to which operation of the serving cell is to switch. This may be done by using a location and bandwidth (LocationAndBandwidth) field to indicate a starting frequency and size of the second network bandwidth. The LocationAndBandwidth field may specify a set of contiguous common resource blocks that belong to the second network bandwidth. The value of the LocationAndBandwidth field may be interpreted as a resource indicator value (RIV) as defined in 3GPP TS 38.214 v17.2.0 (2022 Jun. 23).

The LocationAndBandwidth field may be similar to that used for legacy bandwidth part (BWP) switching, which has a maximum RIV value of 37,949 and covers a maximum of 275 physical resource blocks (PRBs) with RB-level granularity. In some embodiments, the location or bandwidth signaling of the network bandwidth indication may have a granularity larger than a resource block (RB)-level granularity to save signaling overhead. For example, the granularity used for the network bandwidth indication may be in a unit of a plurality of RBs instead of a single RB.

As an alternative to the location and bandwidth signaling, some embodiments may provide a direct indication of the second network bandwidth using a bitmap. Each bit of the bitmap may correspond to a single RB or a set of contiguous RBs that are included in the second network bandwidth.

In some embodiments, a plurality of potential bandwidths may be configured to the UE 204. These potential bandwidths may be signaled using a location and bandwidth or bitmap approaches described above. The configuration of the potential bandwidths may be through RRC signaling or a media access control-control element (MAC-CE). Individual potential bandwidths of the list of potential bandwidths may be associated with a corresponding index. The network bandwidth indication, which may be dynamically provided in DCI, may then simply include an index to select one of the potential bandwidths as the second network bandwidth to which operation is to be switched.

In some embodiments, the base station 108 may also provide a subcarrier spacing (SCS) associated with the second network bandwidth. The indication of the SCS may be transmitted along with the network bandwidth indication or separately therefrom, or may be configured together with each of the potential bandwidths.

In various embodiments, the network bandwidth indication may be common to all UEs of a serving cell, or may apply to a group of UEs of the serving cell (e.g., a subset of all UEs of the serving cell).

If the network bandwidth indication applies to all UEs of a serving cell, the base station 108 may transmit the network bandwidth indication with cell-specific signaling such as, for example, one or more system information block (SIB) messages, or a broadcast DCI message that is monitored by all UEs. If the network bandwidth indication applies to a group of UEs of the serving cell, the base station 108 may transmit the network bandwidth indication using group-common DCI.

In some embodiments, the UE 204 may identify one or more parameters at 220 that may be used to monitor for the transmission of the network bandwidth indication. These parameters may be predefined by a 3GPP TS, for example, or configured to the UE 204 by a network. If configured by the network, one or more these parameters may be provided in a broadcast message such as, for example, a SIB message or via UE-specific RRC signaling.

The parameters may be used to monitor for the network bandwidth indication in the broadcast or group-common DCI. These parameters may include, for example, a radio network temporary identity (RNTI) corresponding to the broadcast or group-common DCI (the RNTI being used to scramble cyclic-redundancy check (CRC) bits of the DCI), a search space set to monitor for the DCI, a size of the DCI, or a start position of the network bandwidth indication within the DCI.

After sending the network bandwidth indication at 216, the base station 108 may switch to the second network bandwidth at 224. In some embodiments, the base station 108 may delay switching to the second network bandwidth until a certain time period after transmitting the network bandwidth indication. This time period, which may also be referred to as an application delay, may provide the UE 204 with sufficient time to process the network bandwidth indication and prepare for communications with respect to the second network bandwidth.

After switching to the second network bandwidth, the base station 108 and the UE 204 may communicate using the second network bandwidth. As shown in the signaling diagram 200, the base station 108 and UE 204 may perform UL/DL transmissions in resources provided by a configured or dynamic grant at 228.

In some embodiments, the second network bandwidth may be valid for a validity duration. At 232, the base station 108 and UE 204 may detect an end to the validity duration and switch to another network bandwidth. The other network bandwidth may be the one that the serving cell 112 was previously operating in (for example, the first network bandwidth) or it may be a default network bandwidth. The default network bandwidth may be configured via higher layer signaling (e.g. a SIB message or UE-specific RRC signaling).

In some embodiments, the validity duration may be from the time the network bandwidth indication is transmitted at 216 (subject to a possible application delay) until another network bandwidth indication is transmitted (subject to another possible application delay). Thus, the detection of the end of the validity duration may be transmission/reception of a subsequent network bandwidth indication (or expiration of application delay after transmission/reception of the subsequent network bandwidth indication).

In some embodiments, the validity duration may be a predetermined time duration. A single time duration may be indicated to be valid in a SIB message and may be applied when the UE 204 receives the network bandwidth indication (or after an application delay after receiving the network bandwidth indication). Additionally/alternatively, a plurality of time durations may be configured by a SIB message (or other signaling) and the time duration to be applied as the validity duration is dynamically selected from the plurality of time durations. The dynamic selection of the time duration may be transmitted together with the network band indication.

In some embodiments, the indicated second network bandwidth may be valid with respect to an on/off pattern. For example, a pattern may be defined with an ON duration and an OFF duration. The indicated second network bandwidth may be valid during the ON duration and the previous network bandwidth (e.g., first network bandwidth) or a default network bandwidth) may be value during the OFF duration. Parameters that define on/off pattern (for example, a periodicity, length of the ON duration, and length of the OFF duration) may be predefined by a 3GPP TS, configured via higher layer signaling, or dynamically signaled.

The on/off pattern may be activated until receiving another indication or for a limited time duration.

After receiving the network bandwidth indication at 216, behavior of the UE 204 may be defined by a number of options and may be based on a relationship between frequency configurations of the network (for example, the second network bandwidth) and the UE 204 (for example, active/configured BWPs of the UE 204).

Figure 3:
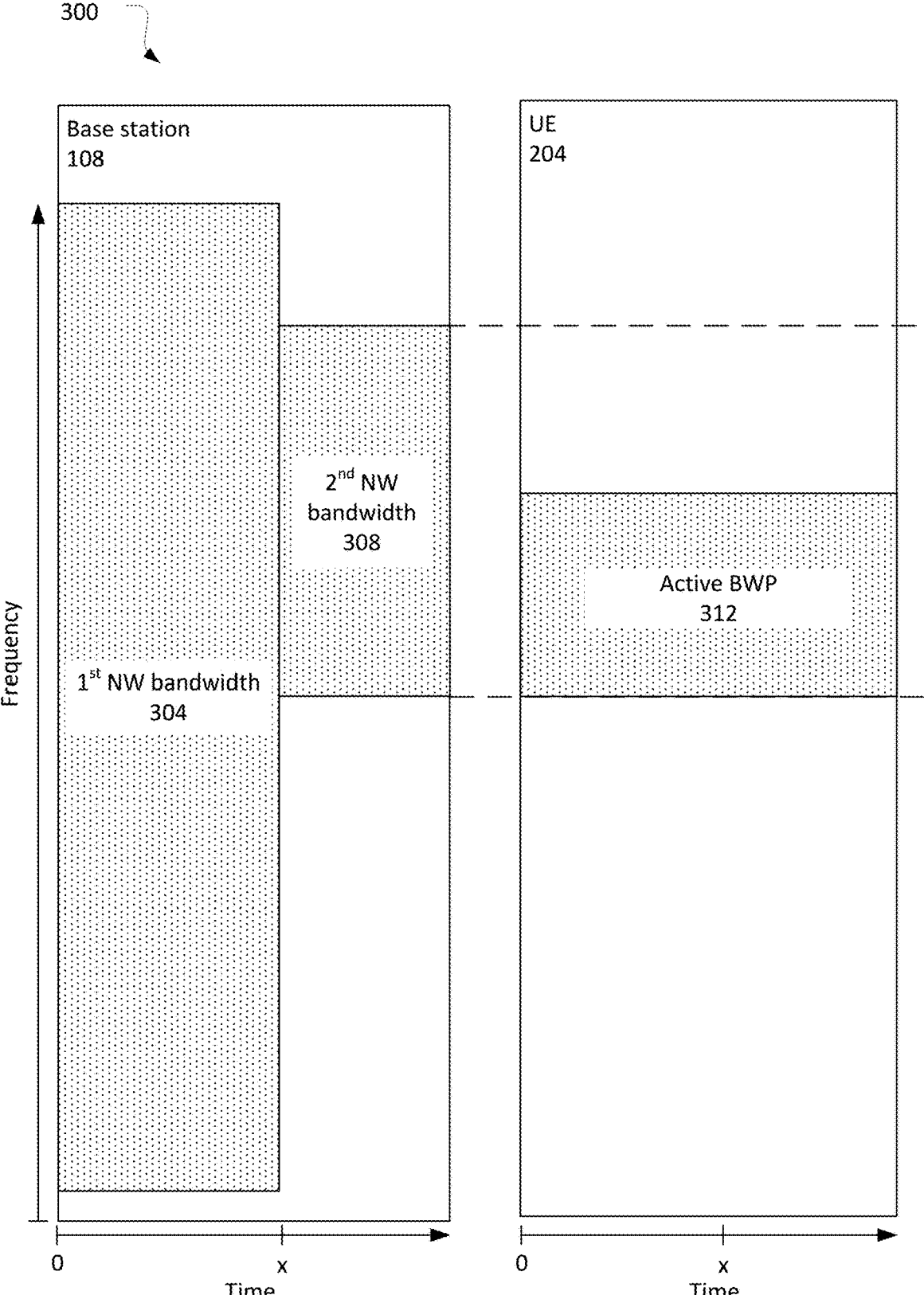
FIG. 3 illustrates a frequency configuration in accordance with some embodiments.
Figure 4:
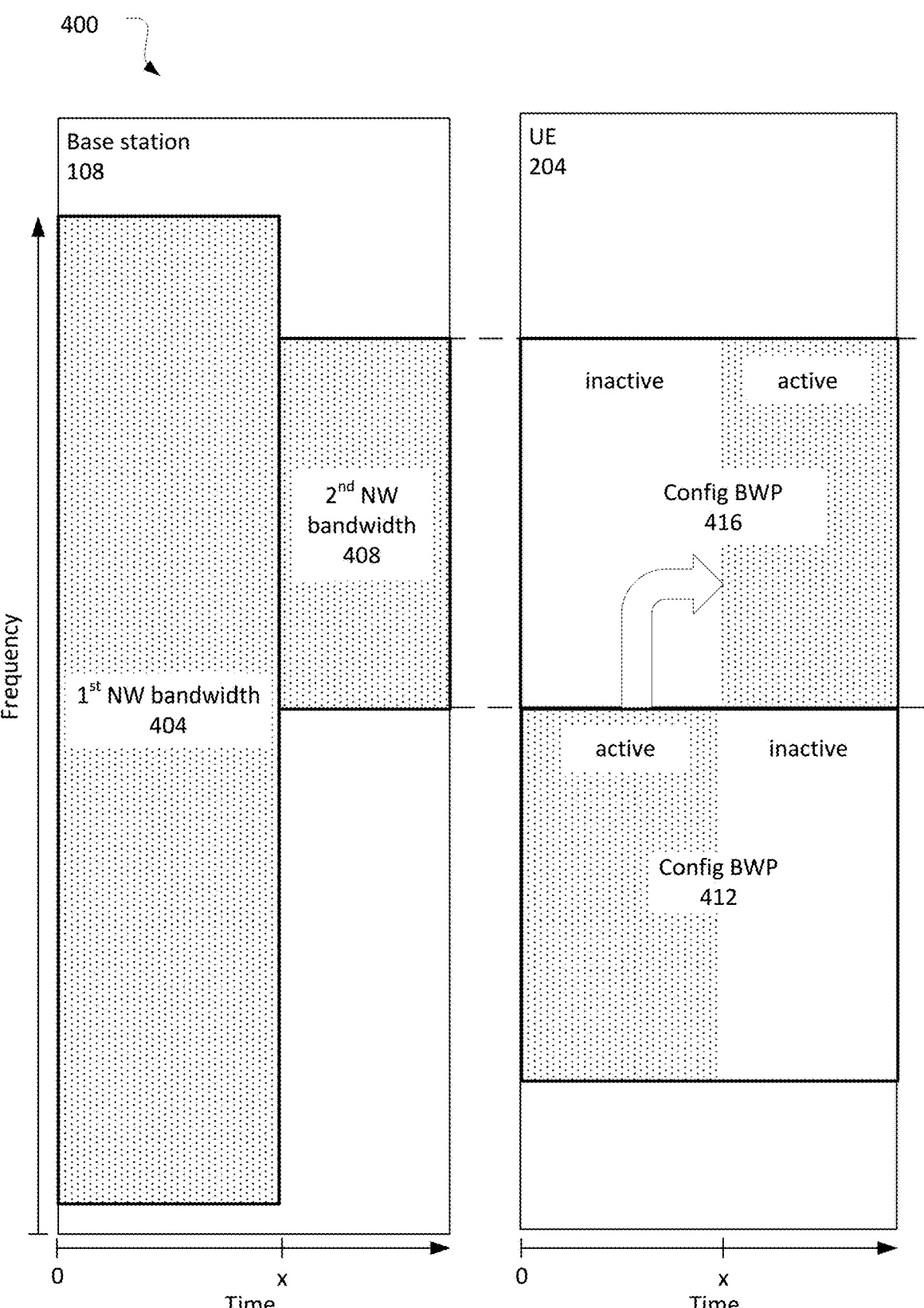
FIG. 4 illustrates another frequency configuration in accordance with some embodiments.
Figure 5:
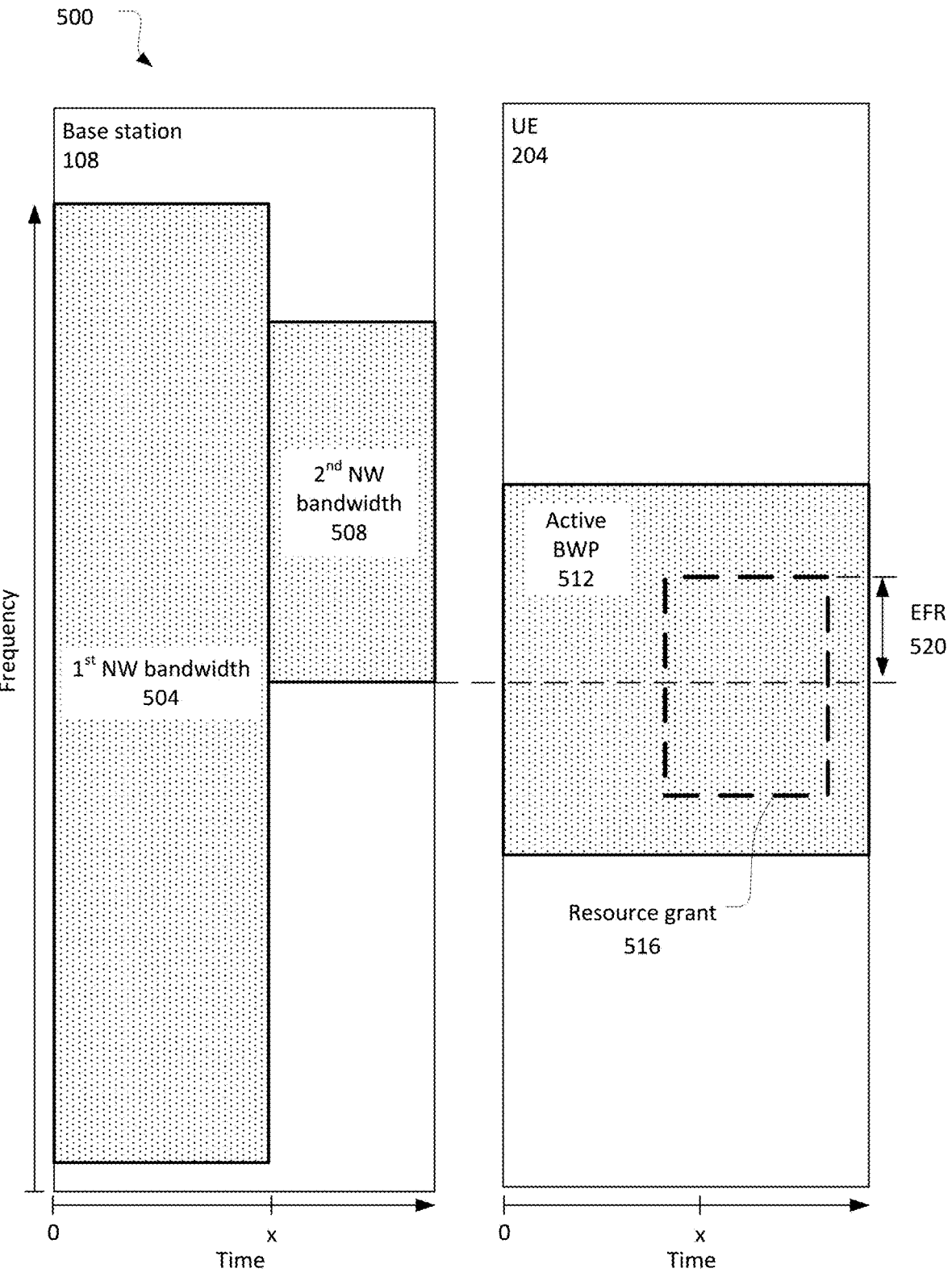
FIG. 5 illustrates another frequency configuration in accordance with some embodiments.

FIGS. 3-5 illustrates example frequency configurations of the first/second network bandwidths and various active/configured BWPs and resource grants in accordance with some embodiments. In FIGS. 3-5 various operating frequencies are provided for the base station 108 and the UE 204 before and after the base station 108 switches from a first network bandwidth to a second network bandwidth. The second network bandwidth may be the indicated network bandwidth consistent with the description elsewhere herein. The switching is shown generally at time x. These example configurations are presented to facilitate the following discussion of UE behavior upon receiving a network bandwidth indication. They are not meant to be restrictive to other embodiments.

FIG. 3 illustrates a frequency configuration 300 in which the base station 108 switches form a first network bandwidth 304 to a second network bandwidth 308, and the UE 204 has an active BWP 312. Configuration 300 may represent a first option in which the second network bandwidth 308 fully contains the active BWP 312. In this option, the UE 204 may continue to operate with the active BWP 312 and may follow existing behavior. Thus, the UE 204 may continue to transmit UL communications or receive DL communications in the active BWP 312 after the switch at x.

FIG. 400 illustrates a frequency configuration 400 in which the base station 108 switches from a first network bandwidth 404 to a second network bandwidth 408, and the UE 204 has configured BWPs 412 and 416. Configuration 400 may represent a second option in which the second network bandwidth 408 is aligned with one of a configured BWPs of the UE 204. With this option, the UE 204 may be operating with an BWP 412 as the active BWP when the base station 108 is operating with the first network bandwidth 404. However, the UE 204 may determine that the second network bandwidth 408 is aligned with configured BWP 416. Thus, the UE 204 may switch the active BWP from the BWP 412 to BWP 416 at time x and may transmit UL communications or receive DL communications in the BWP 416 after the switch at x.

When the UE 204 performs a BWP switch, as described above, it may follow legacy BWP switching behavior in terms of application delay and other UE procedures.

In some embodiments, the UE 204 may determine that the second network bandwidth 408 aligns with the configured BWP 416 based on an alignment of an index corresponding with the second network bandwidth 408 and an identity of the configured BWP 416. Thus, the UE 204 may check the index of the second network bandwidth 408, and directly switch to the BWP 416, which has a corresponding ID. To facilitate this operation, a proper mapping may be maintained between the network bandwidth indexes and UE's BWP IDs. The network may maintain this mapping, which may be configured to the UE 204.

In some embodiments, the UE 204 may check the frequency location of the second network bandwidth 408 (and the associated SCS, if provided) against the UE's configured BWPs. This may provide more flexibility for the network configuration.

As a variation of this option, the UE 204 may switch to a configured BWP that is fully contained within the second network bandwidth. If there are multiple configured BWPs that are fully contained within the second network bandwidth, one of them may be chosen, e.g. the one with lowest BWP index, or the one with the largest bandwidth.

In a third option, the UE 204 may not switch active BWPs, but its behavior may be impacted by the indication of the second network bandwidth. These operations may be considered in the context of dynamically scheduled transmission/reception (e.g., dynamic grants that are scheduled by DCI) and in the context of configured transmission/ reception (for example, configured grants that are configured by RRC or MAC signaling (and possibly activated by DCI)).

Three aspects may be considered with respect to dynamically scheduled transmission/reception.

In first aspect, the UE 204 may assume that the transmission/reception is within both the UE's active BWP and the indicated network bandwidth, which may need to be guaranteed by the base station. No special handling is needed by the UE 204 in this case.

In a second aspect, the UE 204 may continue to transmit or receive if a frequency resource indicated by a scheduling DCI is fully contained in the indicated network bandwidth. If the frequency resource indicated by the scheduling DCI is not fully contained in the indicated network, the UE 204 may not perform the scheduled UL/DL transmission according to the second aspect.

FIG. 5 illustrates a configuration 500 in which the base station 108 switches from a first network bandwidth 504 to a second network bandwidth 508, and the UE 204 has configured an active BWP 512. Configuration 500 may represent a third aspect of operation in which the UE 204 receives a dynamic grant and does not switch active BWPs.

In configuration 500, the UE 204 may receive a UL/DL transmission dynamically scheduled in a resource grant 516. The resource grant 516 may be entirely within the active BWP 512 but may only partially overlap the second network bandwidth 508 in frequency. With the third aspect, the UE 204 may identify an effective frequency resource (EFR) 520 as an intersection of the second network bandwidth 508 and a frequency resource indicated by the DCI that schedules the resource grant. The UE 204 may then proceed with the scheduled UL/DL transmission in the portion of the resource grant 516 that corresponds to the EFR 520.

For some dynamically scheduled transmissions/receptions, the frequency resource may be directly indicated in the scheduling DCI. This may be the case with a number of physical downlink shared channel (PDSCH) and physical uplink shared channel (PUSCH) transmissions including, for example, broadcast PDSCHs scheduled in a common search space such as SIB 1 and other SIB messages. In these instances, the base station 108, when scheduling the UL/DL transmission, may easily indicate a frequency resource allocation within the indicated network bandwidth. Thus, the first aspect may be a simpler implementation in some instances.

For some dynamically scheduled UL/DL transmissions (for example, channel state information-reference signals (CSI-RSs), sounding reference signals (SRSs), and physical uplink control channel (PUCCH) transmissions), the frequency resource may be dynamically indicated in the DCI using an index that points to a configured resource. The configured resource may typically be configured based on the BWP. Both the first and third aspects may be used in this case. However, the first aspect may be more restrictive as the network may only be able to indicate a configured resource that is within the indicated network bandwidth. In this case, the third aspect may provide more flexibility in terms of network configuration and scheduling.

Configured transmissions/receptions may relate to, for example, physical downlink control channel (PDCCH) monitoring, reference signal reception (including CSI-RS, tracking reference signal (TRS), phase tracking reference signal (PTRS), and positioning reference signal (PRS)), SRS, and PUCCH.

Three aspects may be considered with respect to configured transmissions/receptions.

In a first aspect, the UE 204 may assume that the configured transmission/reception is within the indicated network bandwidth. No special handling is needed at the UE 204 in this case.

Implementation of the first aspect may be more challenging on the network side. For example, given that the configuration is done based on BWPs of the UE 204 (and potentially, many other UEs of a serving cell), it may not fully fall within the indicated network bandwidth in many cases. This may especially be the case when the indicated network bandwidth is to conserve energy. The first aspect is restrictive in terms of the resources used for configured transmission/reception, as it requires the network to have the configured resources fully falling within the indicated network bandwidth.

In a second aspect, the UE 204 continues to transmit or receive if the corresponding frequency resource of the configured grant is fully contained in the indicated network bandwidth. If the frequency resource corresponding to the configured grant is not fully contained in the indicated network bandwidth, the UE 204 may not perform the configured UL/DL transmission according to the second aspect.

In a third aspect, the UE 204 may determine that a configured grant resource is not entirely within an active BWP, but only partially overlaps with the indicated network bandwidth. This aspect may be similar to the description above with respect to the third aspect of the dynamic grant scenario depicted in FIG. 5. In the third aspect of the configured grant scenario, the UE 204 may determine an effective frequency resource as an intersection of the indicated network bandwidth and the frequency resource configured for the UL/DL transmission. The UE 204 may then proceed with the configured UL/DL transmission in the effective frequency resources.

In some embodiments, for the special case in which the indicated network bandwidth fully contains the UE's active BWP, the third aspect may fall back to the first aspect, in which the behavior of the UE 204 is not impacted.

In some instances, the configured frequency resource may be indicated with a granularity larger than a single RB. In this case, the same granularity may be used for determining whether a set of RBs is included in the effective frequency resource. For example, frequency resources of a PDCCH may be configured by a frequency domain resources (frequencyDomainResources) field in a control resource set (CORESET) configuration. The frequencyDomainResources field may provide a bitmap, with each bit corresponding to six RBs. In embodiments of the present disclosure, if any RB of the six RBs does not belong to the indicated network bandwidth, the corresponding 6 RBs are not included in the effective frequency resources.

In some embodiments, a UE may behave according to different aspects for different types of configured transmissions/receptions. The specific behavioral aspect to be used for a particular type of configured transmission/reception may be predefined by a 3GPP TS, for example, or configured by the network. Some examples are provided below.

For receiving synchronization signal and physical broadcast channel blocks (SSBs), the UE 204 may use the second aspect. For example, the UE 204 may continue to monitor the SSB if it is within the indicated network bandwidth. If the configured grant resource for an SSB is not within the indicated network, the UE may not monitor the resource for the SSB.

A resource for PDCCH monitoring on common search space (CSS) (except for Type-3 CSS) may be configured in broadcast RRC signaling. The base station 108 may use the broadcast signaling to change the CORESET for all the UEs, if needed. Therefore, the UE 204 may operate in accordance with either the first aspect or the second aspect.

A resource for PDCCH monitoring on Type-3 CSS or UE-specific search space set (USS) may be configured in UE-specific signaling. This signaling may be transmitted to each UE of a cell in order to change the CORESET configuration. In order to avoid a large overhead, the UE 204 may operate in accordance with the third aspect.

In some embodiments, the UE 204 may operate in accordance with the third aspect for other types of configured transmissions/receptions as well. This may provide more flexibility at the base station 108.

For the third option, in which the UE 204 does not switch active BWPs, but its behavior may be impacted by the indication of the second network bandwidth, an application delay may be used to allow sufficient time for UE processing. The application delay may be similar to that shown and described above with respect to FIG. 2, and may be the same as the application delay for BWP switching. The application delay may be predefined by a 3GPP TS, for example, or determined by the network based on a reported UE capability. If determined by the network, the base station 108 may signal the application delay to the UE 204 (unless both the base station 108 and the UE 204 can determine the application delay independently based on the reported UE capability)

In addition to adjusting the frequency resource allocation, there may be other bandwidth-dependent features that may be addressed in the UE behavior for the third option. For example, if the UE 204 is configured for frequency hopping within an active BWP, the frequency hopping may need to be adjusted after receiving the network bandwidth indication. In some embodiments, the frequency hopping may be adjusted to be within an effective frequency bandwidth. This may be done by adjusting the frequency hopping pattern to have smaller spacing between frequency hops so that all the hops fall within the effective frequency bandwidth, or to remove one or more hops that are outside of the effective frequency bandwidth. The effective frequency bandwidth may be the intersection of the indicated network bandwidth and the active BWP of the UE 204, similar to that described above with respect to FIG. 5.

In some embodiments, the UE 204 may consider the effective frequency bandwidth, which is the intersection of the indicated network bandwidth and the active BWP, to be an effective BWP. Thus, the UE 204 may use the effective BWP, rather than the active BWP, for all operations. The change from the active BWP to the effective BWP may be analogous to BWP switching; however, no separate BWP configuration is needed or provided for the effective BWP. Thus, the effective BWP would not be considered a configured BWP of the UE 204.

In some embodiments, the UE 204 may provide an indication to the base station 108 of which options/aspects are supported. The base station 108 may then configure the UE 204 to follow an option/aspect, subject to its capability.

Various examples of UE behavior with respect to different network operations are provided below. Other combinations are also possible.

In a first example, the base station 108 may be restricted to providing an indicated network bandwidth that is aligned with one of the configured BWPs of each of the UEs 104. In this case, a UE may switch to its configured BWP that is aligned with the indicated network bandwidth after receiving the network bandwidth indication. A UE may consider it an error case if the indicated network bandwidth is not aligned with any of its configured BWPs. In this case, all the UEs 104 may follow option 2 discussed above.

In a second example, the base station 108 may be restricted to providing an indicated network bandwidth that is either aligned with a UE's configured BWPs or fully contains a UE's active BWP. Thus, each of the UEs 104 may either have an active BWP that is fully contained by the indicated network bandwidth, or a configured BWP that aligns with the indicated network bandwidth. If a UE has an active BWP that is fully contained by the indicated network bandwidth, the UE may follow option 1 discussed above. If a UE has a configured BWP that aligns with the indicated network bandwidth, the UE may follow option 2 discussed above.

In a third example, the base station 108 may provide an indicated network bandwidth that, for at least one of the UEs 114, is neither aligned with its configured BWP nor fully contains its active BWP. If the indicated network bandwidth fully contains a UE's active BWP, the UE may follow option 1 discussed above. If the indicated network bandwidth neither aligns with a UE's configured BWP nor fully contains its active BWP, the UE may follow option 3 discussed above.

In a fourth example, the base station 108 may provide an indicated network bandwidth that, for at least one of the UEs 114, is neither aligned with its configured BWP nor fully contains its active BWP. If the indicated network bandwidth fully contains a UE's active BWP, the UE may follow option 1 discussed above. If the indicated network bandwidth is aligned with one of a UE's configured BWPs, the UE may follow option 2. And, if the indicated network bandwidth neither aligns with a UE's configured BWP nor fully contains its active BWP, the UE may follow option 3 discussed above.

In some embodiments, the UE behaviors may be configurable by the network.

Figure 6:
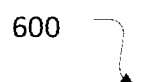
FIG. 6 illustrates an operation flow/algorithmic structure in accordance with some embodiments.
Figure 6:
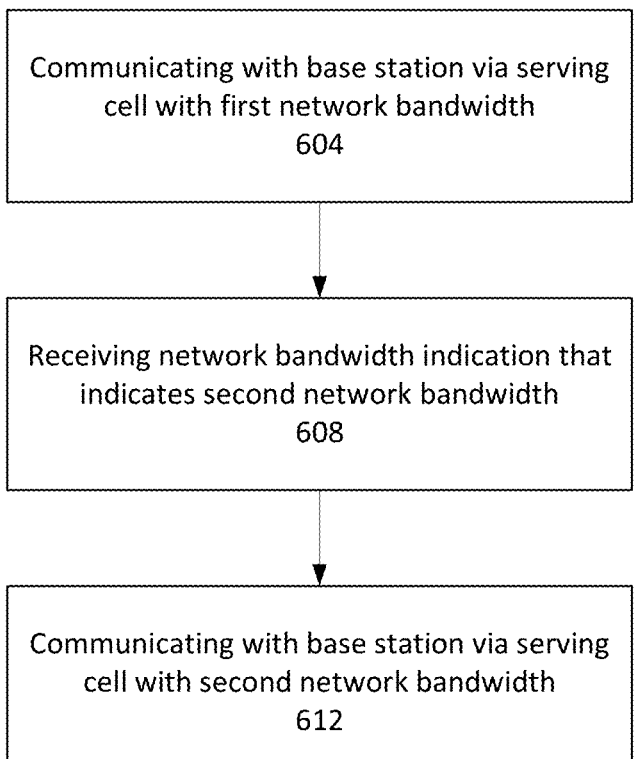

FIG. 6 provides an operation flow/algorithmic structure 600 in accordance with some embodiments. The operation flow/algorithmic structure 600 may be performed by a UE such as one of the UEs 104, UE 204, or UE 800; or components thereof, for example, processors 804.

The operation flow/algorithmic structure 600 may include, at 604, communicating with a base station via a serving cell with a first network bandwidth. The first network bandwidth may be a relatively large bandwidth that covers a significant portion of a carrier.

The operation flow/algorithmic structure 600 may further include, at 608, receiving a network bandwidth indication that indicates a second network bandwidth. The network bandwidth indication may be received in a SIB message or in a broadcast or group-common DCI. If the network bandwidth indication is received in a broadcast or group-common DCI, the UE may utilize one or more identified parameters to receive the DCI. These parameters may include, for example, RNTI used for receiving the group-common DCI, an indication of a search space for monitoring for the DCI, a size of the DCI, or a start position of the network bandwidth indication in the DCI. One or more of these parameters may be received from the network in a broadcast message.

The network bandwidth indication may indicate the second network bandwidth by providing a starting location and size of the second network bandwidth; a bitmap with a plurality of bits that respectively correspond to a plurality of resource blocks or contiguous resource block sets of the second network bandwidth; or an index that identifies the second network bandwidth from a plurality of preconfigured network bandwidths. The preconfigured network bandwidths may be predefined by a 3GPP TS, for example, or previously configured by network signaling.

In some embodiments, the UE may also receive subcarrier spacing associated with the second network bandwidth.

The operation flow/algorithmic structure 600 may further include, at 612, communicating with the base station via the serving cell with the second network bandwidth.

The communication at 612 may be based on a relationship between the second network bandwidth; configured or active BWPs of the UE; and resources scheduled for UL/DL transmissions.

If the UE determines the second network bandwidth encompasses an active BWP of the UE, the UE may continue to operate within the active BWP. If the UE determines the second network bandwidth aligns with a configured BWP of the UE or encompasses a configured BWP of the UE, the UE may switch to the configured BWP. Thus, the UE may interpret the network bandwidth indication as a BWP switching command. The UE may then communicate using the configured BWP aligned with the second network bandwidth as the active BWP.

In some embodiments, the UE may determine that the second network bandwidth is aligned with the configured BWP based on an association between an index of the second network bandwidth and an identity of the configured BWP. This association may be stored in memory of the UE and may be either predefined or configured by the network.

In other embodiments, the UE may determine a frequency location associated with the second network bandwidth. This frequency location may be compared to frequency locations associated with the configured BWP's of the UE. This comparison may be used to determine whether the second network bandwidth aligns with or encompasses any of the UE's configured BWPs.

In some embodiments, the UE may receive a resource grant. The resource grant may be a configured grant or dynamic grant. If the resource grant is within the second network bandwidth, the UE may proceed to perform the scheduled transmission or reception in the resource grant. If the resource grant is not completely within the second network bandwidth, the UE may identify an effective frequency resource that corresponds to an intersection of the resource grant and the second network bandwidth. The UE may then proceed to perform the scheduled transmission or reception in the portion of the resource grant that is within the effective frequency resource.

In some embodiments, if a configured resource grant is at least partially outside of the second network bandwidth, the UE may refrain from performing a scheduled transmission or reception in the configured resource grant.

Communication with the base station using the second network bandwidth may continue for a validity duration associated with the network bandwidth indication. In some embodiments, the duration may be signaled in a SIB message. In some embodiments, a plurality of durations may be configured (by SIB or some other signaling) and an indication of the duration to use of the plurality of durations may be later signaled (by DCI or some other signaling).

Figure 7:
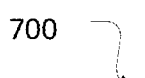
FIG. 7 illustrates another operation flow/algorithmic structure in accordance with some embodiments.
Figure 7:
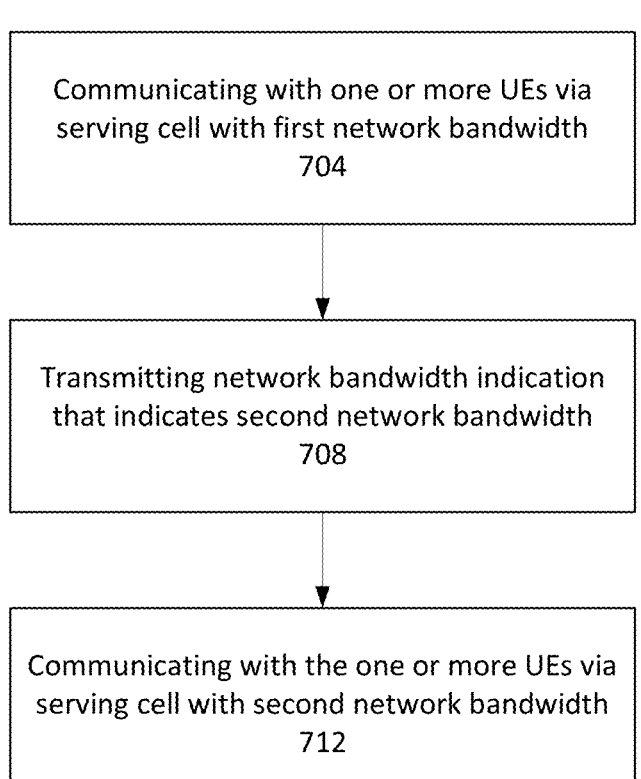

FIG. 7 is an operation flow/algorithmic structure 700 in accordance with some embodiments. The operation flow/algorithmic structure 700 may be performed by a base station such as base station 108 or base station 900; or components thereof, for example, processors 904.

The operation flow/algorithmic structure 700 may include, at 704, communicating with one or more UEs via a serving cell having a first network bandwidth.

The operation flow/algorithmic structure 700 may further include, at 708, transmitting a network bandwidth indication. The network bandwidth indication is to indicate that operation of the serving cell is to change to a second network bandwidth. The second network bandwidth may be smaller than the first network bandwidth in order to conserve energy, or the second network bandwidth may be larger than the first network bandwidth to move out of the energy-saving mode. The network bandwidth indication may be sent in a SIB message or group-common DCI to some or all of the UEs of the serving cell.

In some embodiments, the base station may provide UEs of a serving cell with one or more parameters to facilitate detection and decoding of the signaling that includes the network bandwidth indication.

The content of the network bandwidth indication may be similar to that described elsewhere herein.

In some embodiments, selection of the second network bandwidth may be based on various configurations of the UEs of a particular serving cell. For example, the base station may try to configure a second network bandwidth in a manner in which each of the UEs will have an active BWP that is fully contained by the second network bandwidth or a configured BWP that aligns with the second network bandwidth.

The operation flow/algorithmic structure 700 may further include, at 712, communicating with the UEs via the serving cell having the second network bandwidth. The communication using the second network bandwidth may include providing dynamic or configured grants to schedule UL/DL transmissions. In some instances, these grants may provide an application delay from signaling of the network bandwidth indication to allow the UEs with time to process the indication and perform any necessary adjustments. The application delay may be based on UE capability reports received from the UEs.

The base station may operate the serving cell with the second network bandwidth for a validity duration. The validity duration may be signaled to the UEs or may be predefined. Upon expiration of the validity duration, the base station may switch back to the previous network bandwidth (for example, the first network bandwidth) or to a default network bandwidth.

Figure 8:
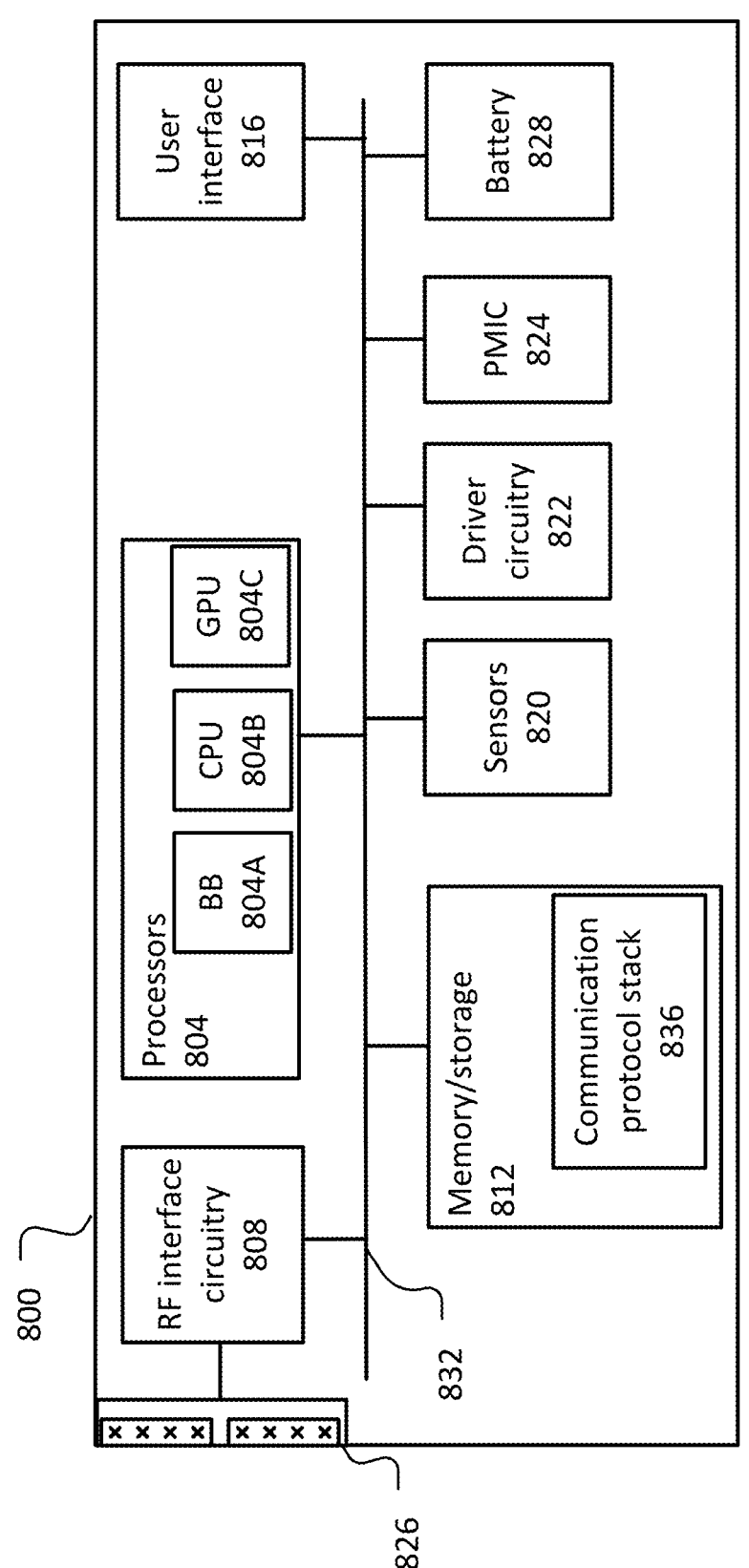
FIG. 8 illustrates a user equipment in accordance with some embodiments.

FIG. 8 illustrates an example UE 800 in accordance with some embodiments. The UE 800 may be any mobile or non-mobile computing device, such as, for example, a mobile phone, a computer, a tablet, an industrial wireless sensor (for example, a microphone, a carbon dioxide sensor, a pressure sensor, a humidity sensor, a thermometer, a motion sensor, an accelerometer, a laser scanner, a fluid level sensor, an inventory sensor, an electric voltage/current meter, or an actuators), a video surveillance/monitoring device (for example, a camera), a wearable device (for example, a smart watch), or an Internet-of-things (IoT) device.

The UE 800 may include processors 804, RF interface circuitry 808, memory/storage 812, user interface 816, sensors 820, driver circuitry 822, power management integrated circuit (PMIC) 824, antenna structure 826, and battery 828. The components of the UE 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the UE 800. However, some of the components shown may be omitted, additional components may be present, and different arrangement of the components shown may occur in other implementations.

The components of the UE 800 may be coupled with various other components over one or more interconnects 832, which may represent any type of interface, input/output, bus (local, system, or expansion), transmission line, trace, optical connection, etc. that allows various circuit components (on common or different chips or chipsets) to interact with one another.

The processors 804 may include processor circuitry such as, for example, baseband processor circuitry (BB) 804A, central processor unit circuitry (CPU) 804B, and graphics processor unit circuitry (GPU) 804C. The processors 804 may include any type of circuitry or processor circuitry that executes or otherwise operates computer-executable instructions, such as program code, software modules, or functional processes from memory/storage 812 to cause the UE 800 to perform operations as described herein.

In some embodiments, the baseband processor circuitry 804A may access a communication protocol stack 836 in the memory/storage 812 to communicate over a 3GPP compatible network. In general, the baseband processor circuitry 804A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 808.

The baseband processor circuitry 804A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 812 may include one or more non-transitory, computer-readable media that includes instructions (for example, communication protocol stack 836) that may be executed by one or more of the processors 804 to cause the UE 800 to perform various operations described herein. The memory/storage 812 include any type of volatile or non-volatile memory that may be distributed throughout the UE 800. In some embodiments, some of the memory/storage 812 may be located on the processors 804 themselves (for example, L1 and L2 cache), while other memory/storage 812 is external to the processors 804 but accessible thereto via a memory interface. The memory/storage 812 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 808 may include transceiver circuitry and radio frequency front module (RFEM) that allows the UE 800 to communicate with other devices over a radio access network. The RF interface circuitry 808 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 826 and proceed to filter and amplify (with a low-noise amplifier) the signal. The signal may be provided to a receiver of the transceiver that down-converts the RF signal into a baseband signal that is provided to the baseband processor of the processors 804.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna structure 826.

In various embodiments, the RF interface circuitry 808 may be configured to transmit/receive signals in a manner compatible with NR access technologies.

The antenna structure 826 may include antenna elements to convert electrical signals into radio waves to travel through the air and to convert received radio waves into electrical signals. The antenna elements may be arranged into one or more antenna panels. The antenna structure 826 may have antenna panels that are omnidirectional, directional, or a combination thereof to enable beamforming and multiple-input, multiple-output communications. The antenna structure 826 may include microstrip antennas, printed antennas fabricated on the surface of one or more printed circuit boards, patch antennas, phased array antennas, etc. The antenna structure 826 may have one or more panels designed for specific frequency bands including bands in FR1 or FR2.

The user interface 816 includes various input/output (I/O) devices designed to enable user interaction with the UE 800. The user interface 816 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 800.

The sensors 820 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 822 may include software and hardware elements that operate to control particular devices that are embedded in the UE 800, attached to the UE 800, or otherwise communicatively coupled with the UE 800. The driver circuitry 822 may include individual drivers allowing other components to interact with or control various input/output (I/O) devices that may be present within, or connected to, the UE 800. For example, driver circuitry 822 may include a display driver to control and allow access to a display device, a touchscreen driver to control and allow access to a touchscreen interface, sensor drivers to obtain sensor readings of the sensors 820 and control and allow access to the sensors 820, drivers to obtain actuator positions of electro-mechanic components or control and allow access to the electro-mechanic components, a camera driver to control and allow access to an embedded image capture device, audio drivers to control and allow access to one or more audio devices.

The PMIC 824 may manage power provided to various components of the UE 800. In particular, with respect to the processors 804, the PMIC 824 may control power-source selection, voltage scaling, battery charging, or DC-to-DC conversion.

In some embodiments, the PMIC 824 may control, or otherwise be part of, various power saving mechanisms of the UE 800. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 800 may power down for brief intervals of time and thus save power. If there is no data traffic activity for an extended period of time, then the UE 800 may transition off to an RRC_Idle state, where it disconnects from the network and does not perform operations such as channel quality feedback, handover, etc. The UE 800 goes into a very low power state and it performs paging where again it periodically wakes up to listen to the network and then powers down again. The UE 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 828 may power the UE 800, although in some examples the UE 800 may be mounted deployed in a fixed location, and may have a power supply coupled to an electrical grid. The battery 828 may be a lithium ion battery, a metal-air battery, such as a zinc-air battery, an aluminum-air battery, a lithium-air battery, and the like. In some implementations, such as in vehicle-based applications, the battery 828 may be a typical lead-acid automotive battery.

Figure 9:
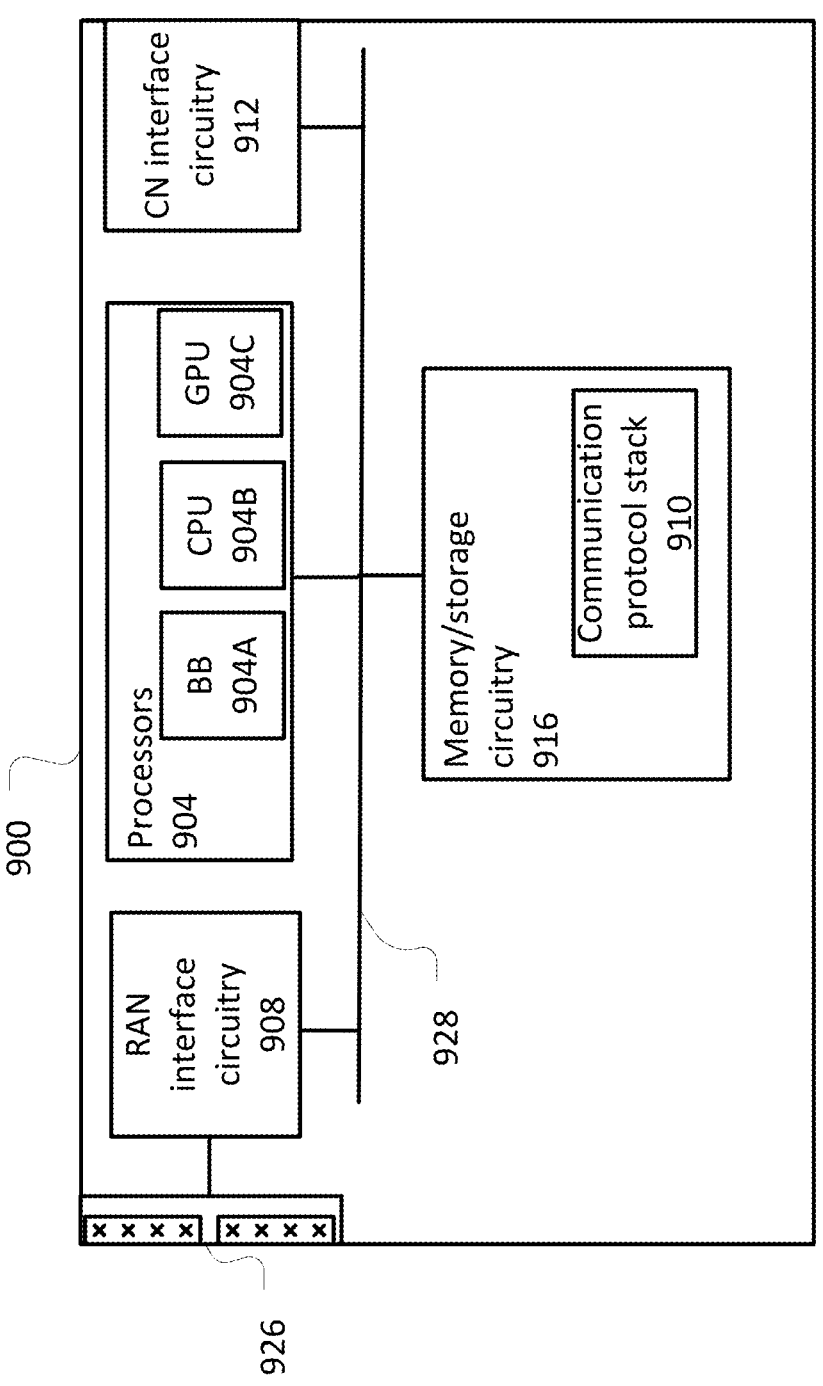
FIG. 9 illustrates a base station in accordance with some embodiments.

FIG. 9 illustrates an example base station 900 in accordance with some embodiments. The base station 900 may be a base station or an AMF as describe elsewhere herein. The base station 900 may include processors 904, RF interface circuitry 908, core network (CN) interface circuitry 912, memory/storage circuitry 916, and antenna structure 926. The RF interface circuitry 908 and antenna structure 926 may not be included when the base station 900 is an AMF.

The components of the base station 900 may be coupled with various other components over one or more interconnects 928.

The processors 904, RF interface circuitry 908, memory/storage circuitry 916 (including communication protocol stack 910), antenna structure 926, and interconnects 928 may be similar to like-named elements shown and described with respect to FIG. 8.

The CN interface circuitry 912 may provide connectivity to a core network, for example, a 5th Generation Core network (5GC) using a 5GC-compatible network interface protocol such as carrier Ethernet protocols, or some other suitable protocol. Network connectivity may be provided to/from the base station 900 via a fiber optic or wireless backhaul. The CN interface circuitry 912 may include one or more dedicated processors or FPGAs to communicate using one or more of the aforementioned protocols. In some implementations, the CN interface circuitry 912 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment (UE), the method comprising: communicating with a base station via a serving cell having a first network bandwidth; receiving, from the base station, a network bandwidth indication that indicates operation of the serving cell is to change to a second network bandwidth; and communicating with the base station via the serving cell having the second network bandwidth.

Example 2 includes the method of example 1 or some other example herein, further comprising: receiving the network bandwidth indication in a system information block (SIB) message.

Example 3 includes the method of example 1 or some other example herein, further comprising: identifying one or more parameters; receiving downlink control information (DCI), having the network bandwidth indication, based on the one or more parameters, wherein the one or more parameters include a radio network temporary identity (RNTI) for receiving the DCI, an indication of a search space set for monitoring for the DCI, a size of the DCI, or a start position of the network bandwidth indication in the DCI.

Example 4 includes a method of example 3 or some other example herein, further comprising: receiving at least one parameter of the one or more parameters in a broadcast message or a UE-specific message.

Example 5 includes the method of example 1 or some other example herein, wherein the network bandwidth indication comprises: an indication of a starting location and size of the second network bandwidth; a bitmap with a plurality of bits that respectively correspond to a plurality of resource blocks or contiguous resource block sets of the second network bandwidth; or an indication of an index to identify the second network bandwidth from a plurality of preconfigured network bandwidths.

Example 6 includes the method of example 1 or some other example herein, further comprising: receiving an indication of a subcarrier spacing associated with the second network bandwidth.

Example 7 includes the method of example 1 or some other example herein, further comprising: determining the second network bandwidth is aligned with a configured bandwidth part (BWP) of the UE; and switching to the configured BWP based on said determining that the second network bandwidth is aligned with the configured BWP of the UE.

Example 8 includes the method of example 7 or some other example herein, wherein the network bandwidth indication includes an index associated with the second network bandwidth and the method further comprises: determining the index is also associated with an identity of the configured BWP; and determining the second network bandwidth is aligned with the configured BWP based on said determining the index is also associated with the identity of the configured BWP.

Example 9 includes a method of example 7 or some other example herein, further comprising: determining the second network bandwidth and the configured BWP share a common frequency location; and determining the second network bandwidth is aligned with the configured BWP based on said determining the second network bandwidth and the configured BWP share a common frequency location.

Example 10 includes the method of example 1 or some other example herein, further comprising: receiving a dynamic resource grant within the second network bandwidth; and performing a transmission or reception in the dynamic resource grant.

Example 11 includes the method of example 1 or some other example herein, further comprising: receiving a dynamic resource grant; identifying an effective frequency resource that corresponds to an intersection of the dynamic resource grant and the second network bandwidth; and performing a transmission or reception in the effective frequency resource.

Example 12 includes the method of example 1 or some other example herein, further comprising: receiving a configured resource grant; determining or assuming the configured resource grant is fully contained within the second network bandwidth; and performing a transmission or reception in the configured resource grant.

Example 13 includes the method of example 1 or some other example herein, further comprising: receiving a configured resource grant; determining that the configured resource grant is at least partially outside of the second network bandwidth; and refraining from a transmission or reception in the configured resource grant based on said determining that the configured resource grant is at least partially outside of the second network bandwidth.

Example 14 includes the method of example 1 or some other example herein, further comprising: receiving a configured resource grant; identifying an effective frequency resource that corresponds to an intersection of the configured resource grant and the second network bandwidth; and performing a transmission or reception in the effective frequency resource.

Example 15 includes the method of example 14 or some other example herein, wherein the configured resource grant comprises a plurality of resource block sets, with each resource block set having more than one resource block and identifying the effective frequency resource comprises: determining a resource block set of the plurality of resource block sets is within the effective frequency resource if all resource blocks of the resource block set are within the second network bandwidth.

Example 16 includes the method of example 1 or some other example herein, further comprising: determining a duration in which the serving cell is to operate with the second network bandwidth.

Example 17 includes the method of example 16 or some other example herein, wherein determining the duration comprises: detecting an indication of the duration in a system information block (SIB) message; or receiving a configuration of a plurality of durations in a SIB message and receiving, with the network bandwidth indication, an indication of the duration selected from the plurality of durations.

Example 18 includes a method of operating a base station, the method comprising: communicating with one or more UEs via a serving cell having a first network bandwidth; transmitting, to the one or more UEs, a network bandwidth indication that indicates operation of the serving cell is to change to a second network bandwidth; and communicating with the one or more UEs via the serving cell having the second network bandwidth.

Example 19 includes the method of example 18 or some other example herein, further comprising: transmitting the network bandwidth indication in a system information block (SIB) message.

Example 20 includes the method of example 18 or some other example herein, further comprising: transmitting the network bandwidth indication in downlink control information (DCI); and transmitting one or more parameters to facilitate processing of the DCI, the one or more parameters to include a radio network temporary identity (RNTI) for receiving the DCI, an indication of a search space set for monitoring for the DCI, a size of the DCI, or a start position of the network bandwidth indication in the DCI.

Example 21 includes the method of example 20 or some other example herein, further comprising: transmitting the one or more parameters in a broadcast message or a UE-specific message.

Example 22 includes a method of example 18 or some other example herein, wherein the network bandwidth indication comprises: an indication of a starting location and size of the second network bandwidth; a bitmap with a plurality of bits that respectively correspond to a plurality of resource blocks or contiguous resource block sets; or an indication of an index to identify the second network bandwidth from a plurality of preconfigured network bandwidths.

Example 23 includes the method of example 22 or some other example herein, further comprising: transmitting an indication of a subcarrier spacing associated with the second network bandwidth.

Example 24 includes a method of example 18 or some other example herein, further comprising: providing a dynamic or configured resource grant to a UE of the one or more UEs, wherein the dynamic or configured resource grant is within both the second network bandwidth and a configured bandwidth part of the UE.

Example 25 includes a method of example 18 or some other example herein, further comprising: determining an application delay associated with a UE of the one or more UEs; and providing a dynamic or configured resource grant to a UE of the one or more UEs, wherein the dynamic or configured resource grant is associated with uplink or downlink resources that occur at least the application delay from transmitting the network bandwidth indication.

Example 26 includes a method of example 25 or some other example herein, further comprising: receiving a UE capability report; and determining the application delay based on the UE capability report.

Example 27 includes the method of example 18 or some other example herein, further comprising: transmitting, to the UE, an indication of a duration in which the serving cell is to operate with the second network bandwidth.

Example 28 includes the method of example 27 or some other example herein, wherein transmitting the indication of the duration comprises: transmitting the indication of the duration in a system information block (SIB) message; or transmitting a SIB message to configure a plurality of durations and transmitting the indication of the duration with the network bandwidth indication.

Example 29 includes the method of example 27 or some other example herein, further comprising: switching, after the duration, operation of the serving cell to the first network bandwidth or a default network bandwidth.

Example 30 may include an apparatus comprising means to perform one or more elements of a method described in or related to any of examples 1-29, or any other method or process described herein.

Example 31 may include one or more non-transitory computer-readable media comprising instructions to cause an electronic device, upon execution of the instructions by one or more processors of the electronic device, to perform one or more elements of a method described in or related to any of examples 1-29, or any other method or process described herein.

Example 32 may include an apparatus comprising logic, modules, or circuitry to perform one or more elements of a method described in or related to any of examples 1-29, or any other method or process described herein.

Example 33 may include a method, technique, or process as described in or related to any of examples 1-29, or portions or parts thereof.

Example 34 may include an apparatus comprising: one or more processors and one or more computer-readable media comprising instructions that, when executed by the one or more processors, cause the one or more processors to perform the method, techniques, or process as described in or related to any of examples 1-29, or portions thereof.

Example 35 may include a signal as described in or related to any of examples 1-29, or portions or parts thereof.

Example 36 may include a datagram, information element, packet, frame, segment, PDU, or message as described in or related to any of examples 1-29, or portions or parts thereof, or otherwise described in the present disclosure.

Example 37 may include a signal encoded with data as described in or related to any of examples 1-29, or portions or parts thereof, or otherwise described in the present disclosure.

Example 38 may include a signal encoded with a datagram, IE, packet, frame, segment, PDU, or message as described in or related to any of examples 1-29, or portions or parts thereof, or otherwise described in the present disclosure.

Example 39 may include an electromagnetic signal carrying computer-readable instructions, wherein execution of the computer-readable instructions by one or more processors is to cause the one or more processors to perform the method, techniques, or process as described in or related to any of examples 1-29, or portions thereof.

Example 40 may include a computer program comprising instructions, wherein execution of the program by a processing element is to cause the processing element to carry out the method, techniques, or process as described in or related to any of examples 1-29, or portions thereof.

Example 41 may include a signal in a wireless network as shown and described herein.

Example 42 may include a method of communicating in a wireless network as shown and described herein.

Example 43 may include a system for providing wireless communication as shown and described herein.

Example 44 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
communicating with a base station via an active bandwidth part BWP) while a serving cell has a first network bandwidth;
receiving, from the base station in a system information block (SIB) message, a network bandwidth indication that indicates operation of the serving cell is to change to a second network bandwidth;
determining whether the active BWP is within the second network bandwidth;
selecting a second BWP that is within the second network bandwidth based on said determining whether the active BWP is within the second network bandwidth; and
communicating with the base station via the second BWP while the serving cell has the second network bandwidth.

2. The method of claim 1, further comprising:
determining the active BWP includes a first portion within the second network bandwidth and a second portion outside of the second network bandwidth; and
selecting the first portion as the second BWP based on said determining the active BWP includes the first portion within the second network bandwidth and a second portion outside of the second network bandwidth.

3. The method of claim 1, further comprising:
determining the active BWP is fully within the second network bandwidth; and
selecting the active BWP as the second BWP based on said determining the active BWP is fully within the second network bandwidth.

4. The method of claim 1, further comprising:
determining the active BWP is fully outside of the second network bandwidth; and
selecting a configured BWP that is not the active BWP as the second BWP based on said determining the active BWP is fully outside of the second network bandwidth.

5. The method of claim 1, wherein the network bandwidth indication comprises:
an indication of a starting location and size of the second network bandwidth;
a bitmap with a plurality of bits that respectively correspond to a plurality of resource blocks or contiguous resource block sets of the second network bandwidth; or
an indication of an index to identify the second network bandwidth from a plurality of preconfigured network bandwidths.

6. The method of claim 1, further comprising:
receiving an indication of a subcarrier spacing associated with the second network bandwidth.

7. The method of claim 1, wherein the network bandwidth indication includes an index associated with the second network bandwidth and the method further comprises:
determining the index is also associated with an identity of the second BWP; and
switching to the second BWP based on said determining that the index is also associated with the identity of the second BWP.

8. The method of claim 1, wherein the second BWP is a configured BWP of a user equipment (UE).

9. The method of claim 1, further comprising:
receiving a dynamic resource grant within the second network bandwidth; and
performing a transmission or reception in the dynamic resource grant.

10. The method of claim 1, further comprising:
receiving a dynamic resource grant;
identifying an effective frequency resource that corresponds to an intersection of the dynamic resource grant and the second network bandwidth; and
performing a transmission or reception in the effective frequency resource.

11. The method of claim 1, further comprising:
receiving a configured resource grant;
determining or assuming the configured resource grant is fully contained within the second network bandwidth; and
performing a transmission or reception in the configured resource grant.

12. The method of claim 1, further comprising:
receiving a configured resource grant;
determining that the configured resource grant is at least partially outside of the second network bandwidth; and
refraining from a transmission or reception in the configured resource grant based on said determining that the configured resource grant is at least partially outside of the second network bandwidth.

13. The method of claim 1, further comprising:
a configured resource grant;
identifying an effective frequency resource that corresponds to an intersection of the configured resource grant and the second network bandwidth; and
performing a transmission or reception in the effective frequency resource,
wherein the configured resource grant includes a plurality of resource block sets, with each resource block set having more than one resource block and identifying the effective frequency resource includes determining a resource block set of the plurality of resource block sets is within the effective frequency resource if all resource blocks of the resource block set are within the second network bandwidth.

14. The method of claim 1, further comprising:

determining a duration in which the serving cell is to operate with the second network bandwidth, wherein determining the duration comprises:

detecting an indication of the duration in the SIB message; or receiving a configuration of a plurality of durations in the SIB message and receiving an indication of the duration selected from the plurality of durations.

15. A method comprising:

communicating with a user equipments (UEs) via an active bandwidth part (BWP) while a serving cell has a first network bandwidth;

transmitting, to the UEs in a system information block (SIB) message, a network bandwidth indication that indicates operation of the serving cell is to change to a second network bandwidth; and communicating with the UE via a second BWP while the serving cell has the second network bandwidth, wherein the second BWP is: the active BWP if the active BWP is fully within the second network bandwidth; a portion of the active BWP if the active BWP is partially within the second network bandwidth; or a configured BWP separate from the active BWP if the active BWP is fully outside of the second network bandwidth.

16. The method of claim 15, wherein the active BWP is partially within the second network bandwidth and the second BWP is a portion of the active BWP.

17. The method of claim 15, wherein the active BWP is fully within the second network bandwidth and the second BWP is the active BWP.

18. The method of claim 17, wherein the active BWP is fully outside of the second network bandwidth and the second BWP is a configured BWP separate from the active BWP.

19. The method of claim 15, wherein the network bandwidth indication comprises:

an indication of a starting location and size of the second network bandwidth;

a bitmap with a plurality of bits that respectively correspond to a plurality of resource blocks or contiguous resource block sets; or an indication of an index to identify the second network bandwidth from a plurality of preconfigured network bandwidths.

20. The method of claim 15, further comprising:

transmitting an indication of a subcarrier spacing associated with the second network bandwidth.

\* \* \* \* \*